United States Patent
Howie et al.

(10) Patent No.: US 8,708,027 B2
(45) Date of Patent: Apr. 29, 2014

(54) PORTABLE PRIVACY SHIELD FOR AN AUTOMOBILE

(75) Inventors: Jonathan Howie, Lakewood, CO (US); Amy Howie, Lakewood, CO (US)

(73) Assignee: Atmosphere Creative Inc., Lakewood, CO (US)

( * ) Notice: Subject to any disclaimer, the term of this patent is extended or adjusted under 35 U.S.C. 154(b) by 1712 days.

(21) Appl. No.: 11/470,161

(22) Filed: Sep. 5, 2006

(65) Prior Publication Data
US 2008/0054674 A1    Mar. 6, 2008

(51) Int. Cl.
| | |
|---|---|
| A47H 13/00 | (2006.01) |
| A47H 15/00 | (2006.01) |
| E06B 3/00 | (2006.01) |
| E06B 9/00 | (2006.01) |
| A47G 5/00 | (2006.01) |

(52) U.S. Cl.
USPC ................................................ 160/368.1

(58) Field of Classification Search
USPC .............. 160/330, 349.2, 350, 351, 368.1; 296/136.01, 138, 139, 145, 163, 26.12, 296/99.1
See application file for complete search history.

(56) References Cited

U.S. PATENT DOCUMENTS

| | | | | |
|---|---|---|---|---|
| 1,741,424 | A | * | 12/1929 | Lundstrom ................ 135/88.13 |
| 1,935,948 | A | | 11/1933 | Hyrup |
| 2,122,681 | A | * | 7/1938 | Dykes ........................ 135/88.13 |
| 2,204,432 | A | | 6/1940 | Morgandanes |
| 2,770,244 | A | | 11/1956 | Carson |
| 2,926,677 | A | | 3/1960 | Lalonde |
| 3,002,518 | A | | 10/1961 | Maxwell |
| 3,085,621 | A | | 4/1963 | Meranto |
| 3,774,957 | A | | 11/1973 | Basaraba |
| 4,893,668 | A | | 1/1990 | Nomura |
| 5,035,460 | A | * | 7/1991 | Huang ........................ 296/95.1 |
| 5,226,689 | A | | 7/1993 | Roe et al. |
| 5,226,792 | A | * | 7/1993 | Darago ......................... 40/591 |
| 5,244,245 | A | | 9/1993 | Kashino |
| 5,465,776 | A | * | 11/1995 | Mirza ........................ 160/368.1 |
| 5,752,537 | A | | 5/1998 | Kranzler |
| 6,044,856 | A | * | 4/2000 | Cano ........................ 135/88.07 |
| 6,209,598 | B1 | * | 4/2001 | Petrey ........................... 150/154 |
| D492,640 | S | * | 7/2004 | Greene et al. ................ D12/401 |

(Continued)

OTHER PUBLICATIONS

Safer Child, Inc.; Tips for Traveling Safely; www.saferchild.org/travelin.htm (C) 2004.*

(Continued)

*Primary Examiner* — Katherine Mitchell
*Assistant Examiner* — Jeremy Ramsey
(74) *Attorney, Agent, or Firm* — Kilpatrick Townsend & Stockton LLP (57) ABSTRACT

Portable privacy spaces are described that include an open door of a vehicle, and an opaque sheet attached to a first fastener and a second fastener. The first fastener is attached to the open door of the vehicle and the second fastener is attached to another surface of the vehicle. The door, the sheet, and the vehicle form a perimeter for the privacy space. Also, methods of forming a privacy space are described that include the steps of opening a first door of a vehicle, and attaching a first fastener to the open door, where the first fastener is also attached to an opaque sheet. A second fastener is attached to another surface of the vehicle, where the second fastener is also attached to the opaque sheet. The open door, the opaque sheet and the rest of the vehicle form the privacy space.

11 Claims, 8 Drawing Sheets

(56) References Cited

U.S. PATENT DOCUMENTS

| | | |
|---|---|---|
| 6,871,896 B1 | 3/2005 | Owen |
| 7,108,005 B1 * | 9/2006 | Christenson et al. ...... 135/88.13 |
| 7,464,983 B1 * | 12/2008 | Acosta et al. ................. 296/152 |
| 2002/0179132 A1 | 12/2002 | Gutierrez |
| 2006/0000499 A1 * | 1/2006 | Livacich et al. ................ 135/90 |
| 2006/0162755 A1 * | 7/2006 | Platek et al. ............... 135/88.15 |
| 2008/0011435 A1 * | 1/2008 | Wild et al. .................... 160/351 |

OTHER PUBLICATIONS

PCT International Search Report mailed Sep. 16, 2008, International Application No. PCT/US07/77647, 11 pages.

* cited by examiner

PORTABLE PRIVACY SHIELD FOR AN AUTOMOBILE

FIELD OF THE INVENTION

This invention relates generally to privacy spaces that use a vehicle to form a portion of the space. This invention also relates to methods of forming a privacy space between a privacy sheet and a vehicle.

BACKGROUND OF THE INVENTION

Easy automobile access to parks, beaches, bike trails, hiking trails, and other kinds of outdoor recreational areas have given people more opportunities than ever to enjoy the outdoors. Unfortunately, the more people visit these areas, more crowded and stressed they become. Among other problems this overcrowding can cause is a shortage of privacy spaces available for changing into and out of clothes, uniforms, swimsuits, and/or other gear at the recreational area.

For example, outdoor enthusiasts such as surfers, swimmers, bikers, hikers, and sports participants now frequently face inconvenient and/or ineffectual choices for changing in private. These include driving to a less populated and/or less public place to change. Unfortunately, driving in a wet bathing suit or exceedingly dirty clothes can be as or more inconvenient than exposing oneself in public.

Some try looking for less populated parts of the recreation area and/or indigenous cover such as trees, bushes, and buildings in hopes of changing with some amount of privacy. Unfortunately, as more people flock to these areas, especially on nice days and/or at the height of the tourist season, finding such a secluded location can be exceeding difficult if not impossible. Still others try to use on-site public restrooms to change clothes. Unfortunately, crowded recreation areas typically have limited restroom facilities that have to accommodate people relieving themselves as well as changers. This often results in long waits to use the facilities and many frustrated patrons. In many areas, such as trailheads for hikers and bikers, there are no restroom facilities at all.

Another option for those desiring to change in private is to bring the privacy space with them to the recreation area. This includes changing in the automobile itself, pitching a tent in which to change, or wrapping oneself in a large towel while trying to change clothes underneath. Unfortunately, each of these options includes a host of difficulties and inconveniences. Many automobiles, such as compact and subcompact cars, have small interiors that require difficult contortions during the changing process. In addition, the windows on the front, back and sides of the vehicle need to be screened to insure complete privacy. A tent that is large enough for changing can be exceedingly cumbersome to pack and transport in a vehicle. Moreover, pitching and tearing down the tent can be very time consuming relative to the time needed to change clothes. Wrapping oneself in a towel and attempting to change underneath can be a challenge for even the most dexterous clothes changer. Oftentimes the towel comes undone during all the shifting and twisting resulting in a potentially catastrophic wardrobe malfunction.

There have also been attempts to use a car as a support for an attached, adjacent privacy structure. Unfortunately, these structures typically include a complex scaffolding that can be difficult assemble and disassemble, as well as being difficult to attach to the car. Thus, like pitching a tent, the creation of the privacy space can be much more time consuming than the time needed to change clothes. Thus, there remains a need for portable privacy spaces that are easily formed and stored to allow people to quickly and conveniently change clothes in an outdoor area.

BRIEF SUMMARY OF THE INVENTION

Embodiments of the invention include portable privacy spaces that include an open door of a vehicle, and an opaque sheet attached to a first fastener and a second fastener. The first fastener is attached to the open door of the vehicle and the second fastener is attached to another surface of the vehicle. The door, the sheet, and the vehicle form a perimeter for the privacy space.

Embodiments of the invention also include methods of forming a privacy space, where the methods may include the steps of opening a first door of a vehicle, and attaching a first fastener to the open door. The first fastener is also attached to an opaque sheet. The methods may further include attaching a second fastener to another surface of the vehicle, where the second fastener is also attached to the opaque sheet. The open door, the opaque sheet and the rest of the vehicle form the privacy space.

Embodiments of the invention may further include methods of attaching a privacy shield to an automobile. The methods may include the steps of opening a door of the automobile, and attaching a first suction cup to a window on the open door. The first suction cup may also be attached to a first top corner of the privacy shield. The methods may further include attaching a second suction cup to a second window of the automobile, where the second suction cup may also be attached to a second top corner on an opposite side of the privacy shield from the first top corner. A first magnet may be attached to a metal part of the open door, where the first magnet is integrated into a first bottom corner of the privacy shield. In addition, a second magnet may be attached to another metal part of the automobile, where the second magnet is integrated into a second bottom corner on an opposite side of the privacy shield from the first bottom corner.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

A privacy space is described that is portable and easily formed and deconstructed using a privacy sheet attached to a car, truck, or other vehicle. The privacy space provides a user with a confined but comfortable area to wash, bathe, remove clothing and/or change clothing, among other activities. A significant portion of the privacy space is formed by the vehicle, reducing the amount of sheet material required to complete the space, and obviating the need for scaffolding or other stiff structural elements to support the material. This allows the non-vehicular portion of the privacy space to be made from a simple opaque sheet that can be easily folded or rolled into a small volume that is easy to store and transport in the vehicle. For example, the sheet could be made from opaque material of a size and thickness that allows the rolled up sheet to fit easily into a glove compartment of an automobile.

Figure 1:
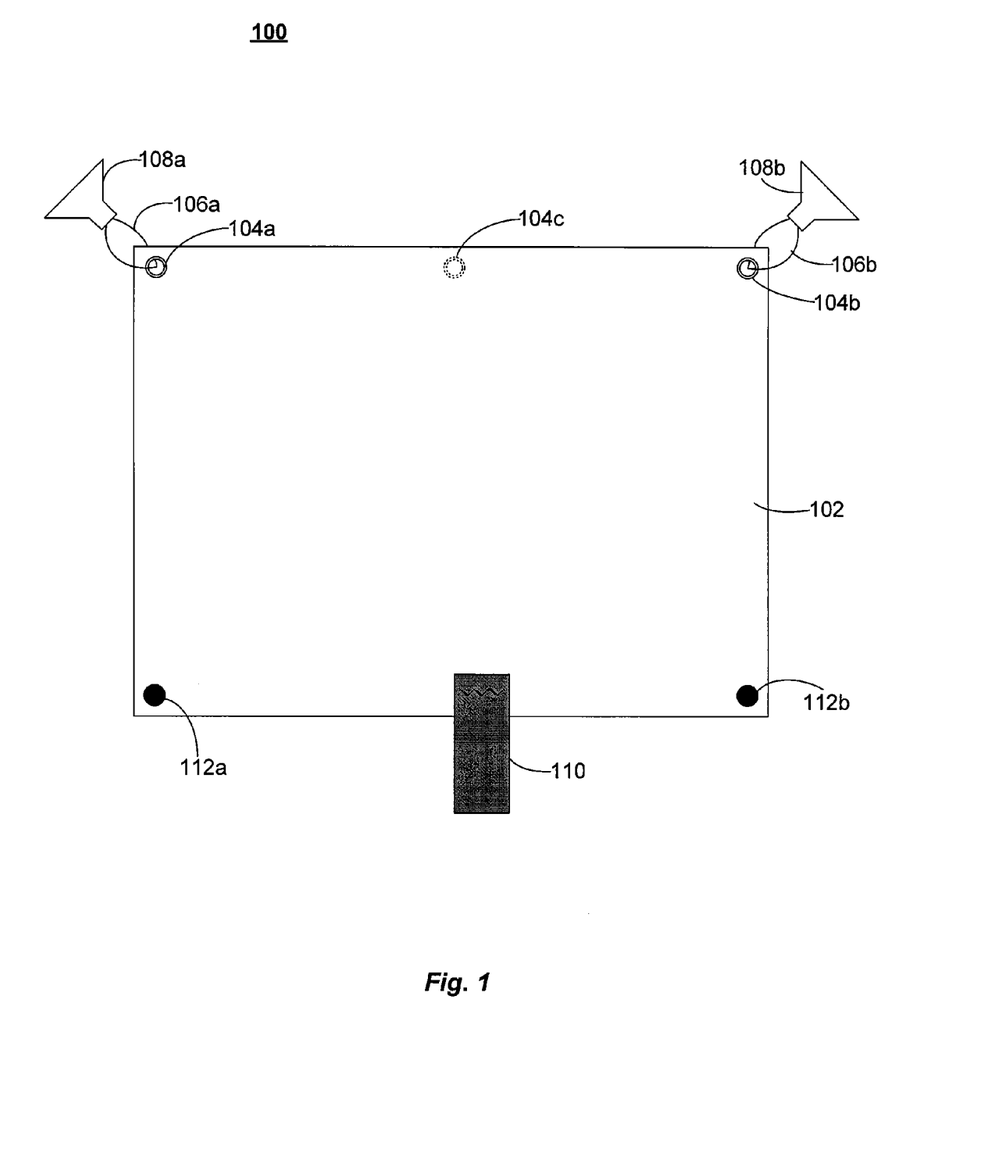
FIG. 1 shows an example of a privacy sheet according to embodiments of the invention.

Referring now to FIG. 1, a privacy sheet 100 is shown that is formed from a sheet 102 of plastic, synthetic fibers, and/or fabric, among other materials. For example, sheet 102 may be formed (at least in part) from colored high density polyethylene, colored low density polyethylene, rubber, vinyl, polyvinyl chloride, and/or polytetrafluoroethylene, among other plastics. The sheet 102 may also be formed (at least in part) from synthetic fibers such as rayon, acetate, nylon, latex, chloroprene, modacrylic, olefin fiber, acrylic, polyester, polyacetide, polytetrafluoroethylene, polyethylene terephthalate polyester, and/or elastane, among other fibers. In addition, sheet 102 may be formed, in part or in whole, from fabric such as burlap, canvas, cotton, denim, fleece, flannel, flax, hemp, linen, ramie, satin, silk, terrycloth, wool, and/or velvet, among other fabrics.

Sheet 102 may include openings 104a-b in the corners of the sheet through which a string, rope, tackle, wire, strap, buckle, snap, or other attachment material 106a-b may be threaded to couple to the sheet to fasteners 108a-b. The openings 104a-b may be reinforced with grommets to prevent the attachment material 106a-b from tearing the sheet 102. Optionally, additional openings (e.g., opening 108c) may be formed in the sheet so that additional fasteners (not shown) may be coupled to the sheet 102.

The fasteners 108a-b shown in FIG. 1 are suction cups designed for reversible attachment to a smooth surface on a vehicle (not shown). For example, fastener 108a may be attached to the window of a open front door while fastener 108b may be attached to a rear door on the same side of the vehicle, or some other rearward surface of the vehicle that is able to form a vacuum bond with the suction cup.

While FIG. 1 shows suction cup fasteners 108a-b, additional types of fasteners may also be used with the privacy sheet 100. These include, for example, a hook, a clip, an adhesive strap, a Velcro strap, a button, and/or a magnet, among other types of fasteners. A single type of fastener (e.g., suction cups) may be used to attach sheet 102 to a vehicle, or two, three, four, or more types of fasteners may be used (e.g., suction cups and magnets).

FIG. 1 also shows the fasteners 108a-b attached to sheet 102 by attachment material 106a-b. Additional embodiments include a more direct attachment of the fasteners to the sheet 102 without the use of a string, strap, or some other kind of attachment material 106. For example, the stems of suction cups 108 may be formed with a tapered end and radial grove that snap into a rigid grommet in opening 104. A strap fastener may be sown or glued directly to the corner of sheet 102. A hook fastener whose distal end attached to a edge surface of the vehicle may have a proximal end that hooks through opening 104, or directly through the material of sheet 102.

Still another example of how fasteners can be coupled to sheet 102 is shown by the bottom fasteners 112a-b in the lower left and right corners of the sheet. In the embodiment shown in FIG. 1, the bottom fasteners 112a-b are magnets that are sown into the corners of sheet 102. In additional embodiments, the magnets 112 may be glued onto the sheet 102. The magnets 112 may reversibly attach to magnetic surfaces of the vehicle. For example, the lower left bottom fastener 112a may magnetically attach to a metal surface of the front vehicle door (not shown) while lower right bottom fastener 112b may magnetically attach to a metal surface rearward of the front door. The bottom fasteners 112a-b may help prevent the bottom corners of sheet 102 from flapping in a breeze and exposing a portion of the privacy space.

In additional embodiments, for example when sheet 102 is made from thick, heavy, and/or relatively stiff materials, one or more of the bottom fasteners 112 may be eliminated. Additional embodiments may also include one or more bottom fasteners 112 that use a different type of fastener than the magnets 112a-b shown. For example, the bottom fasteners 112 may be the same type of fasteners used as upper fasteners 108.

Privacy sheet 100 may also include a fastener 110 to keep sheet 102 in a rolled up position when not in use. The fastener 110 may be a strap sown onto the sheet 102 at or near a proximal end of the strap, and formed with a attachment element (e.g., Velcro®, button, snap, buckle, etc.). The fastener 110 may be wrapped around the rolled up sheet 102 and reversibly attached either to itself, or to a complementary attachment piece on the sheet.

Figure 2A:
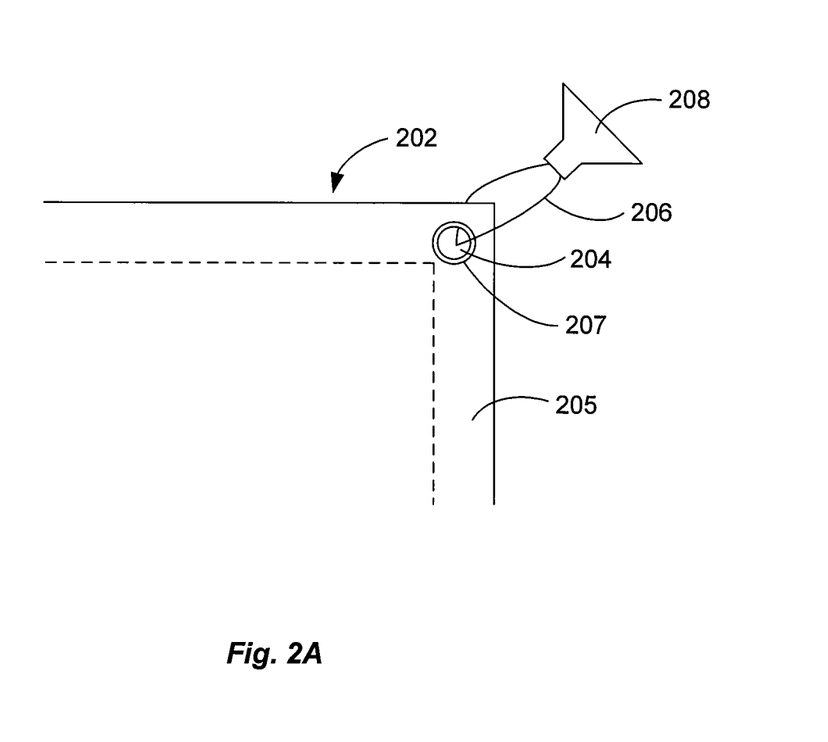
FIG. 2A shows an example of a corner of a privacy sheet attached to a suction cup according to embodiments of the invention.

FIGS. 2A-E show additional details of various embodiments of fasteners coupled to the corners of privacy sheets according to embodiments of the invention. FIG. 2A shows a sheet 202 that includes a central portion 203 and a border portion 205 that is attached (e.g., sown) around the perimeter of the central portion 203. An opening 204 is formed in the corner of the perimeter portion 205 of the sheet 202 through which an attachment material 206 is threaded. A grommet 207 may be attached to the inner diameter of the opening 204 to help keep the attachment material 206 from tearing the sheet 202.

In the embodiment shown in FIG. 2A, the attachment material 206 is a string or wire whose ends are attached to the stem of a suction cup fastener 208. The ends of the attachment material may be glued to the stem and/or tied around the stem of the suction cup, among other ways to couple the pieces. As noted above, additional embodiments have the suction cup fastener directly coupled with the opening 204 in sheet 202, eliminating attachment material 206.

Figure 2B:
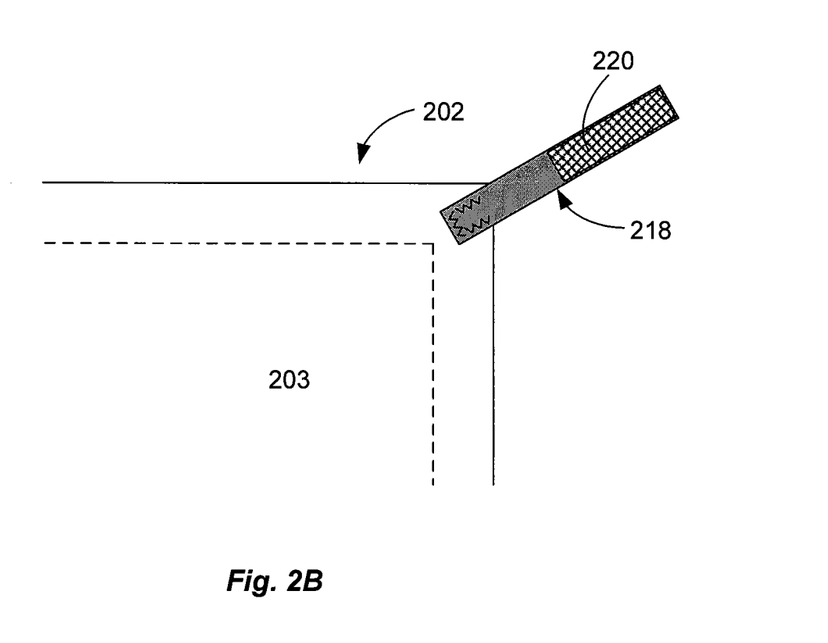
FIG. 2B shows an example of a corner of a privacy sheet attached to a Velcro strap according to embodiments of the invention.

FIG. 2B shows a strap fastener 218 coupled to a corner of sheet 202. In the embodiment shown, the strap fastener 218 is coupled to the sheet by sowing a proximal end of the strap onto the sheet 202. Additional embodiments include gluing or snapping the strap 218 to the sheet 202, among other ways to couple the fastener and sheet. The strap fastener 218 includes an area of Velcro® 220 formed or attached at or near a distal end of the strap. The Velcro® can form an attachment with a complementary piece of Velcro® that is attached (e.g., glued) to a surface on the vehicle. This permits one or more edges of sheet 202 to be reversibly attached to the vehicle by the Velcro®.

Figure 2C:
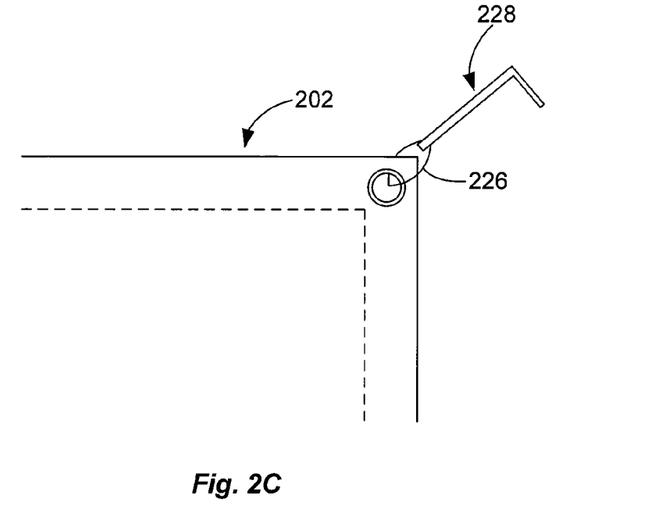
FIG. 2C shows an example of a corner of a privacy sheet attached to a hook according to embodiments of the invention.

FIG. 2C shows a hook fastener 228 coupled to a corner of sheet 202 by an attachment string 226. The string 226 attaches at or near a proximal end of the hook fastener 228, whose distal end can couple to an edge of the vehicle (not shown). For example, the distal end of the hook 228 may be secured over a partially opened car door window. The hook may be further immobilized in position by re-closing the window to clamp down on the hook. As noted above, additional embodiments may have the proximal end of the hook 228 attached directly to the sheet 202.

Figure 2D:
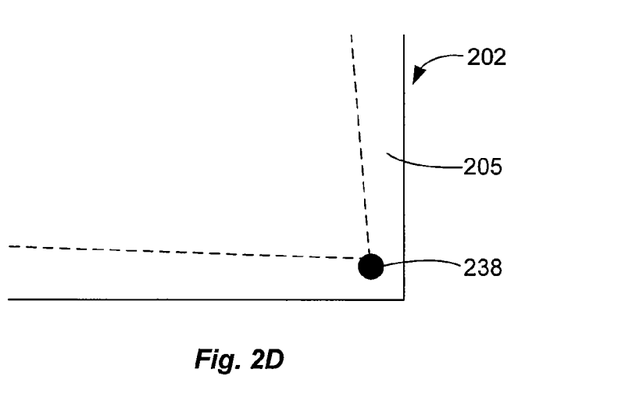
FIG. 2D shows an example of a corner of a privacy sheet with a sown in magnet according to embodiments of the invention.

FIG. 2D shows a magnet fastener 238 attached to a corner of sheet 202. The magnet 238 may be sown into the outer perimeter 205 of the sheet 202, or may be glued or otherwise attached to the corner. In the embodiment shown, the magnet has a circular shape, and additional embodiments include triangular, square, rectangular, etc., shaped magnets.

Figure 2E:
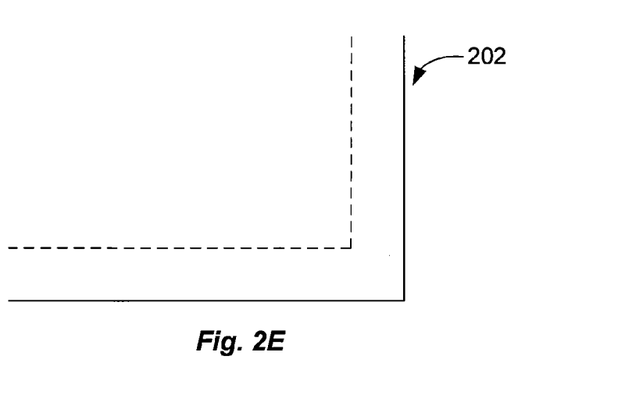
FIG. 2E shows an example of a corner of a privacy sheet with no fastener attached according to embodiments of the invention.

FIG. 2E shows a corner of sheet 202 with no fastener. Embodiments of the invention may include sheet 202 having one or more corners that lack a fastener. For example, when the sheet 202 is made of a relatively thick, heavy, and/or stiff material, fasteners coupled to the bottom corners may be unnecessary, and may be eliminated.

Figure 3:
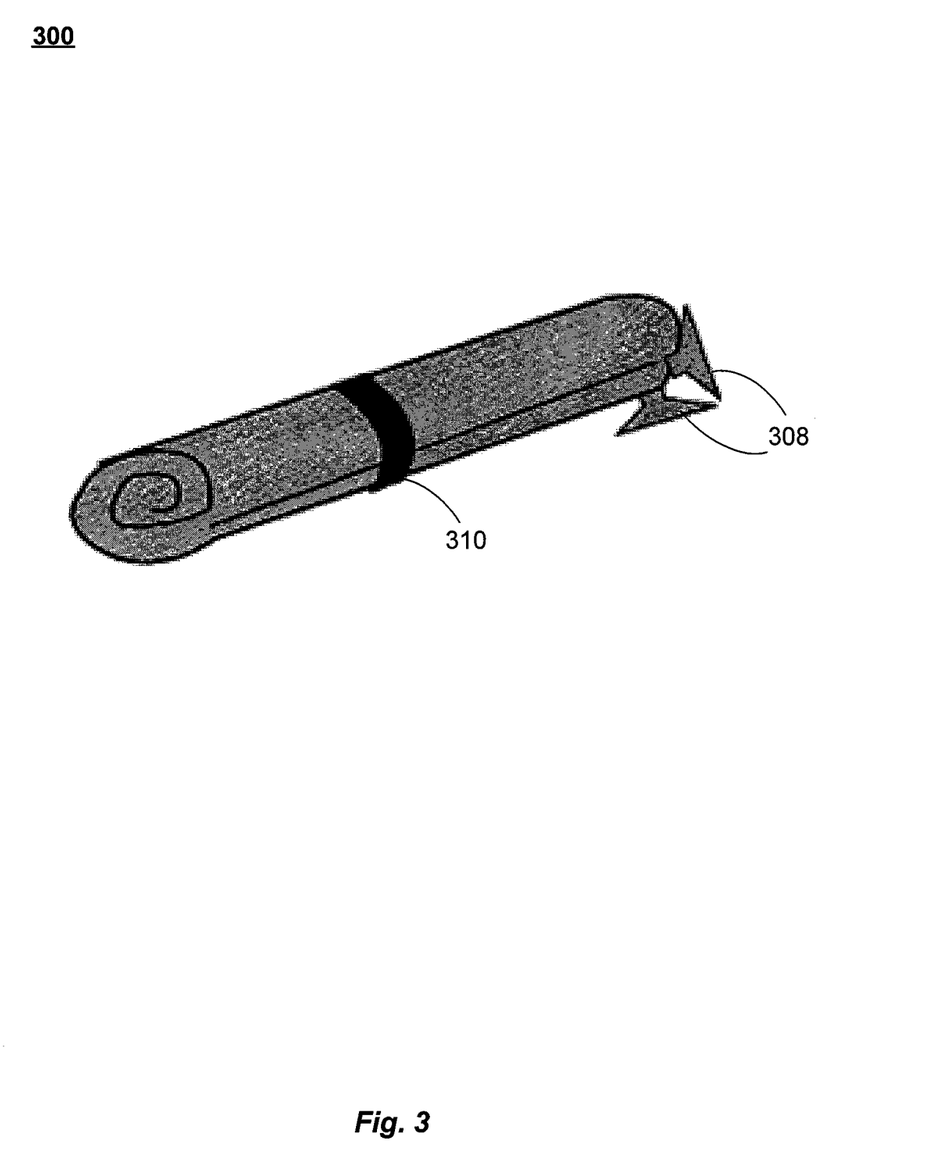
FIG. 3 shows an example of a privacy sheet that has been rolled up for easy transport in a vehicle.

Referring now to FIG. 3, an example of a privacy sheet 300 that has been rolled up for easy transport in a vehicle is shown. The privacy sheet 300 is kept in the furled configuration with the aid of a fastener 310 that wraps around the rolled up sheet and attaches back on itself. Similar to FIG. 1 above, the fastener 310 may be a strap sown onto the sheet at or near a proximal end of the strap, and formed with an attachment element (e.g., Velcro®, button, snap, buckle, etc.) at or near the strap's distal end. A top end of the furled sheet 300 includes a pair of suction cup fasteners 308.

Figure 4:
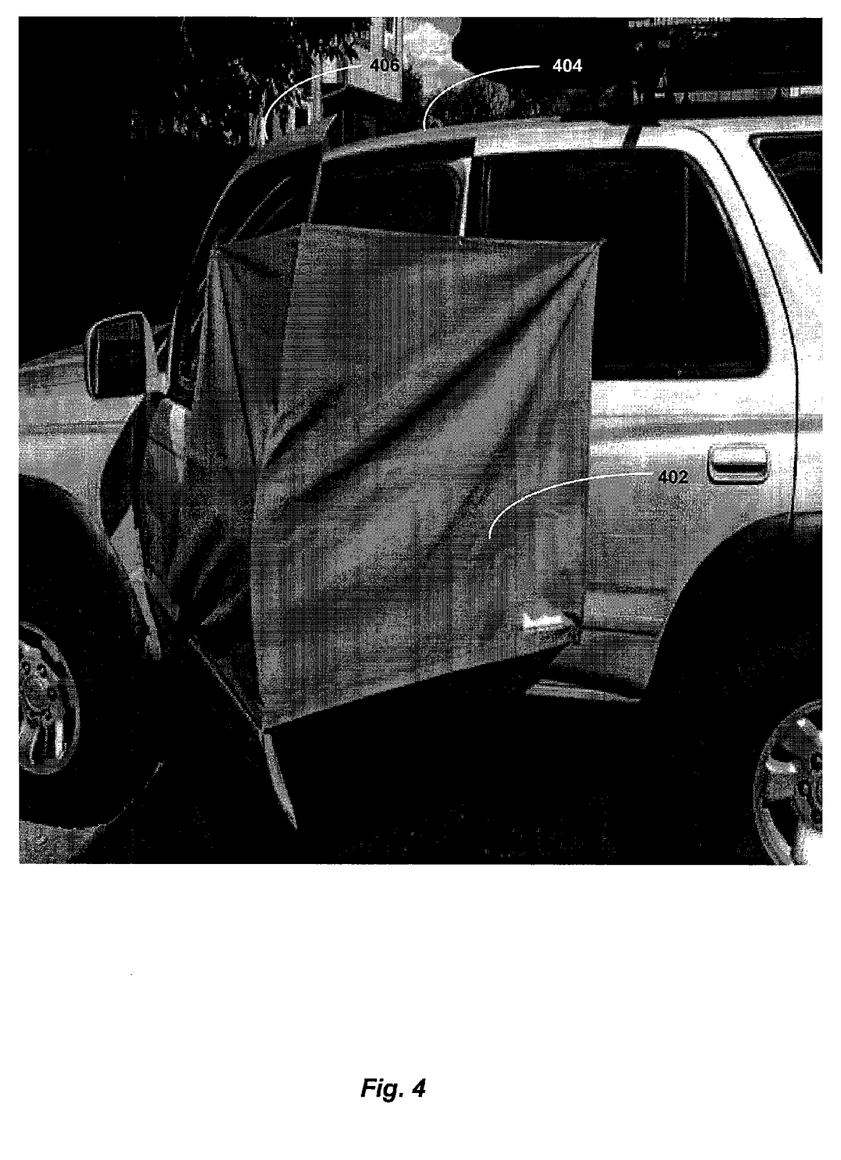
FIG. 4 shows an example configuration of a privacy sheet attached to an open front door of an automobile according to embodiments of the invention.

FIG. 4 shows an example configuration of a privacy sheet 402 attached to an open front door 406 of an automobile 404 according to embodiments of the invention. In the configuration shown, a suction cup fastener is attached to the inside surface of the window of the open front driver's side door 406. This fastener holds an upper left corner of the privacy sheet 402 in place to allow the sheet to form a portion of a privacy space between the sheet and the vehicle. A second suction cup fastener is attached to an outside surface of a window of a closed back door on the same side of the automobile 404. By securing two upper corners of the privacy sheet 402 to the automobile 404 via the suction cup fasteners, the sheet forms part of an enclosed privacy space between the sheet and the automobile.

Figure 5:
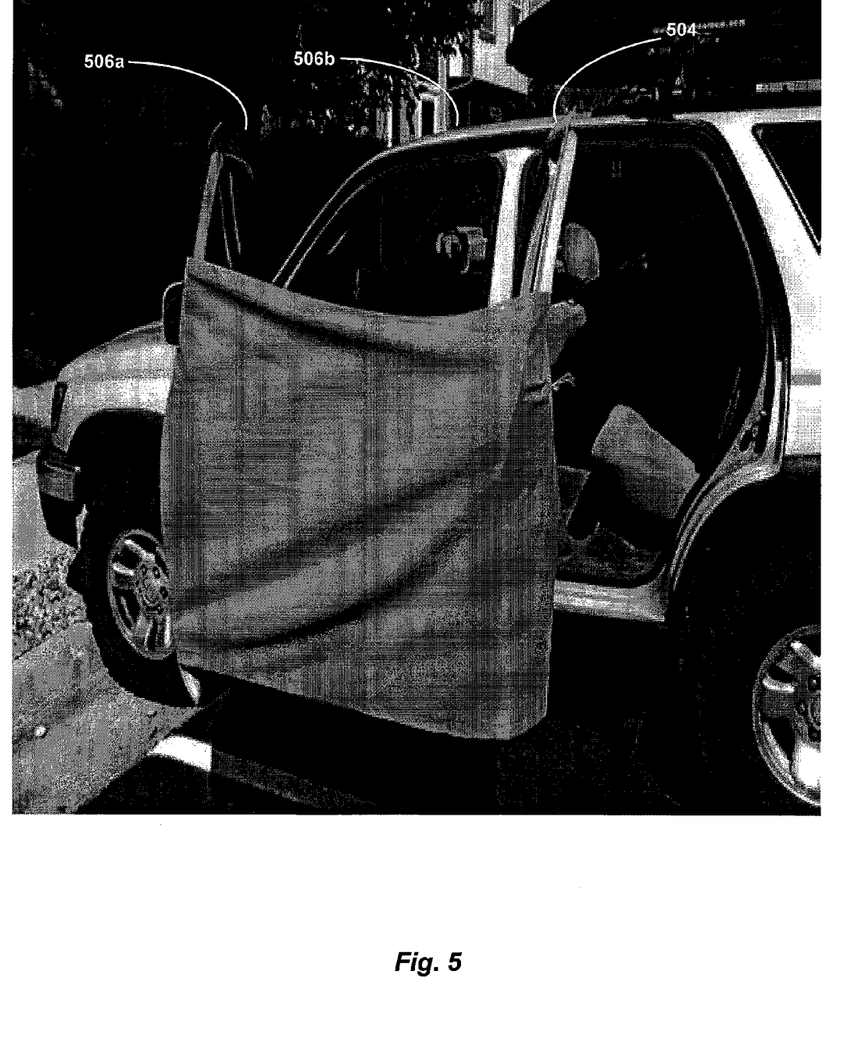
FIG. 5 shows an example of a configuration of a privacy sheet attached to open front and back doors of an automobile according to embodiments of the invention.

FIG. 5 shows another example of a configuration of a privacy sheet 502 attached to open front and back doors 506a-b of an automobile 504 according to embodiments of the invention. In the configuration shown, a first suction cup fastener is attached to the inside surface of the window of the open front driver's side door 506a. A second suction cup fastener is attached to the outside surface of a second window of an open rear driver's side door 506b. By securing two upper corners of the privacy sheet 502 to the automobile 504 via the suction cup fasteners, the sheet forms one side of an enclosed privacy space defined by the sheet and automobile. The privacy space formed by this configuration may have more of a quadrilateral shape (e.g., square, rectangle, etc.) than the space shown in FIG. 4.

Figure 6:
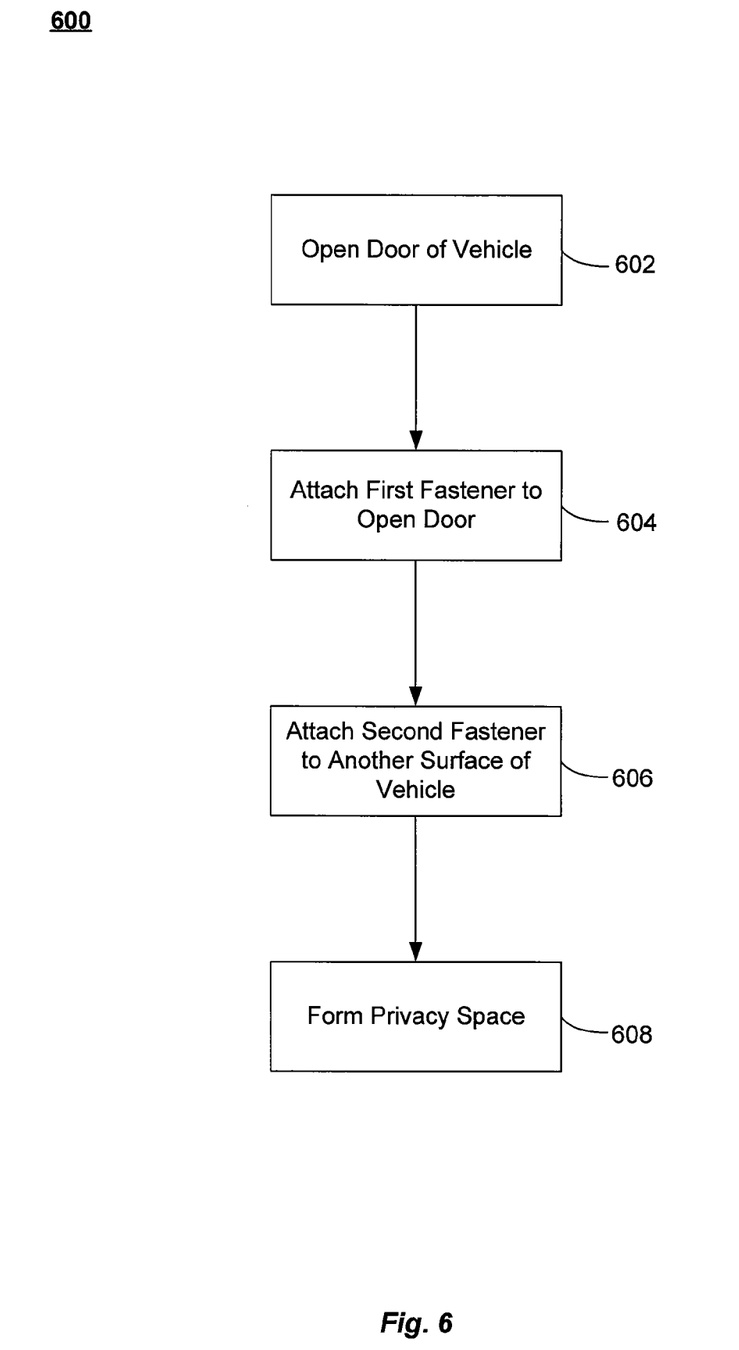
FIG. 6 is a flowchart of an example of a method of forming a privacy space according to embodiments of the invention.

Referring now to FIG. 6, a flowchart of an example of a method 600 of forming a privacy space according to embodiments of the invention is shown. The method 600 may include opening the door of a vehicle 602 to create a first corner of a privacy space. The door may be any door of the vehicle that is used by passengers to gain access to the car, including a front or rear driver's side door, and a front or rear passenger's side door.

A first fastener may be attached to the open vehicle door 604 to hold up a first corner or edge of an opaque sheet (i.e., a privacy sheet). A second fastener may be attached to another surface of the vehicle 606 to form the privacy space 608 between the sheet and the vehicle. If the open door is a front door, the second fastener may be attached to a surface of the vehicle that is rearward of the open door. Likewise, if the open door is a back door, the second fastener may be attached to a surface of the vehicle that is frontward of the open door.

The fasteners may be attached to the vehicle by a privacy seeker who is positioned inside the privacy space. Alternatively, the privacy seeker may stand outside the privacy space while attaching the fasteners to the vehicle and then access the space from under the privacy sheet.

Figure 7:
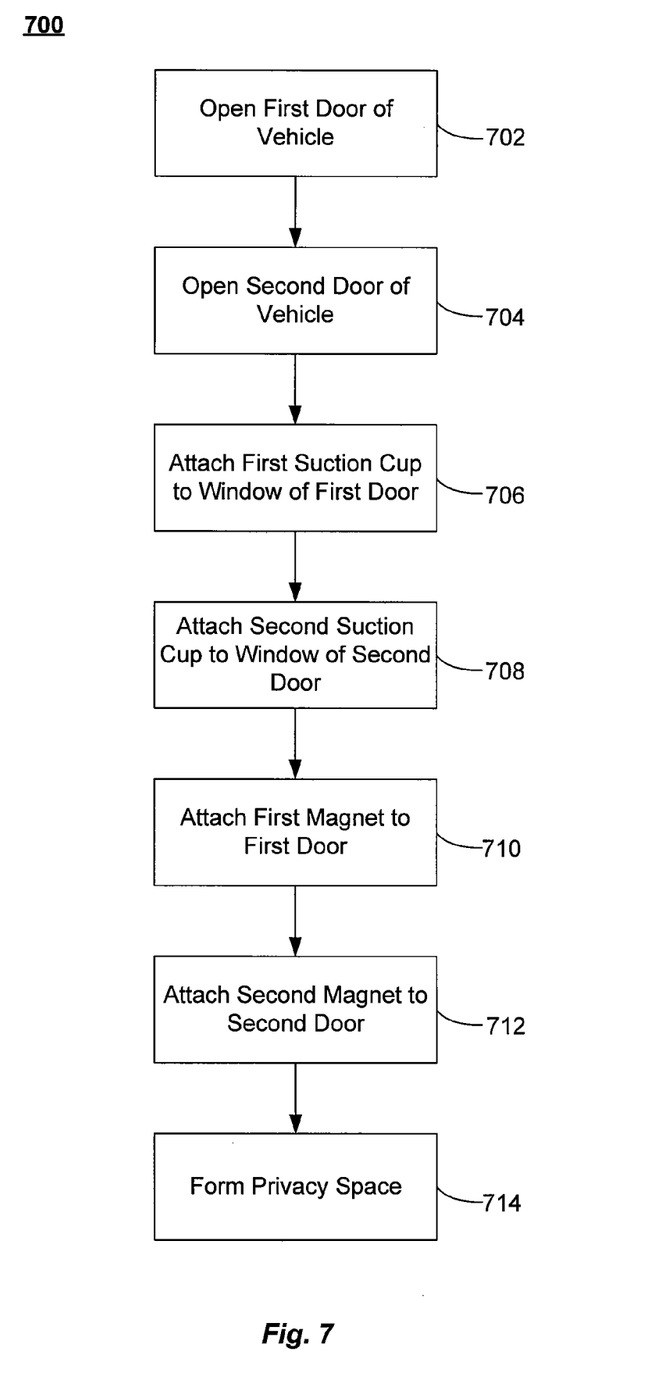
FIG. 7 is a flowchart of an example of a method of attaching a privacy shield to an automobile according to embodiments of the invention.

FIG. 7 shows a flowchart of another example of a method 700 of attaching a privacy shield to an automobile according to embodiments of the invention. The method 700 may include opening a first door of a vehicle 702 and opening a second door of the vehicle 704 to form two sides of the privacy space. A first suction cup can be attached to the window of the first door 706 and a second suction cup can be attached to a second window of the second door 708 to hold up an opaque sheet (i.e., a privacy sheet) between the doors. The sheet, the two open doors, and body of the vehicle form the perimeter of the privacy space 714.

The method 700 may further include securing the bottom edge of the privacy sheet to the vehicle. This may include attaching a first magnet attached to a first bottom corner of the sheet to the first door 710, and a second magnet attached to a second bottom corner to the second door 712. The magnets help control the amount of movement (e.g., flapping) of the privacy sheet in windy/breezy conditions.

Having described several embodiments, it will be recognized by those of skill in the art that various modifications, alternative constructions, and equivalents may be used without departing from the spirit of the invention. Additionally, a number of well known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a method" includes a plurality of such methods and reference to "the fastener" includes reference to one or more fasteners and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of forming a privacy space comprising:
    opening a first door of a vehicle, wherein the first door has a window and an outer edge;
    attaching a first fastener to the exterior of the first open door, wherein the first fastener is also attached to an opaque sheet such that the opaque sheet hangs roughly vertical from the first fastener;
    obscuring a view of an occupant through the window of the first open door with the roughly vertical hanging opaque sheet;
    flexing the opaque sheet at an angle at the vertical outer edge of the first door; and
    attaching a second fastener to another surface of the vehicle, wherein the second fastener is also attached to the opaque sheet such that the opaque sheet hangs roughly vertical from the second fastener,
    wherein the first open door, the roughly vertical surface of the opaque sheet and the rest of the vehicle form the privacy space such that an open space extends vertically through the portable privacy space to allow a person of any height to stand upright within the portable privacy space.

2. The method of claim 1, wherein the method comprises attaching a third fastener to the open door below where the first fastener is attached, wherein the third fastener is also attached to the opaque sheet below where the first fastener is attached to the sheet.

3. The method of claim 1, wherein the method comprises attaching a fourth fastener to the vehicle below where the second fastener is attached, wherein the fourth fastener is also attached to the opaque sheet below where the second fastener is attached to the sheet.

4. The method of claim 1, wherein the method comprises attaching the second fastener to a surface on the second door, wherein the first and second open doors, the opaque sheet and the rest of the vehicle form the privacy space.

5. The method of claim 1, wherein the method comprises storing the opaque sheet in a compacted state in the vehicle and unfurling the sheet before attaching it to the open door of vehicle.

6. The method of claim 1, wherein the first fastener comprises a suction cup, and the attachment of the first fastener to the vehicle comprises attaching the suction cup to an inside surface of a window in the first open door.

7. The method of claim 1, wherein the first fastener comprises a Velcro strap, and the attachment of the first fastener to the vehicle comprises contacting the Velcro strap to a complementary Velcro strip that is secured to an exposed surface of the first open door.

8. The method of claim 7, wherein the complementary Velcro strip is glued to an unhinged edge of the first open door.

9. The method of claim 1, wherein the first fastener comprises a strip of fabric, and the attachment of the first fastener to the vehicle comprises closing a window of the first open door on the fabric strip.

10. The method of claim 1, wherein the second fastener comprises a hook and the attachment of the second fastener to the vehicle comprises affixing the hook around an edge or corner on the vehicle.

11. A portable privacy space comprising:
    a first open door of a vehicle, wherein the first open door is a first side door;
    a second open door of a vehicle, wherein the second open door is a second side door; and
    an opaque sheet attached to a first fastener and a second fastener, wherein
    the first fastener is attached to the first open door of the vehicle, the opaque sheet hanging roughly vertical from the first fastener,
    the second fastener is attached to the second open door of the vehicle, the opaque sheet hanging roughly vertical from the second fastener,
    the first door, the second door, the roughly vertical surface of the sheet, and the vehicle form a perimeter for the portable privacy space such that an open space extends vertically through the portable privacy space to allow a person of any height to stand upright within the portable privacy space,
    the opaque sheet is configured to be attached to the first open door and the second open door from within the privacy space, and
    the first fastener is attached to a top edge of the first open door.

* * * * *